Jan. 9, 1945.  A. DOSCHEK  2,366,844

METHOD OF AND MEANS FOR IDENTIFYING METALS

Filed Feb. 26, 1942

INVENTOR.

BY Antony Doschek

Patented Jan. 9, 1945

2,366,844

UNITED STATES PATENT OFFICE 2,366,844

METHOD OF AND MEANS FOR IDENTIFYING METALS

Antony Doschek, Crafton, Pa.

Application February 26, 1942, Serial No. 432,533

4 Claims. (Cl. 175—183)

This invention relates to a method of and apparatus for identifying a metallic part of unknown composition, by reference to a metallic part of known composition.

One object of my invention is to provide a system and method for identifying a piece of metal of unknown composition, with, and by means of, a test piece of known composition, by determining the magnitudes of the thermo-electric qualities of the two pieces.

Another object of my invention is to provide a rapid and simple method and system for testing a piece of metal to establish the type or classification of the metal, pertaining particularly to steels and alloy metals.

Another object of my invention is to provide a rapid and simple process by means of which a sample piece of unknown composition, picked from a stock of metal, may be quickly identified by comparison with a known sample or test piece taken from the same heat, through determination of the thermo-electric qualities of the two pieces.

Such need for testing and identifying a metallic part arises when the identifying indicia on part becomes lost in the manufacturing process, the mill, or during storage in a warehouse.

For example, when a heat is first poured, the present practice is to make a sample ingot and to chemically analyze it for technical and record purposes. The metal of the heat is hot-worked to shape as desired. Frequently, however, the identifying indicia are lost, and the finished metal must be rechecked to re-identify it before the metal is stacked and stored in the warehouse.

Further still, those identifications may be lost again because the tags have become loose or the labels and stencils obliterated from the finished material during the usual shifting around that takes place when certain pieces are removed from stock. It is necessary again, perhaps, to recheck the material in order to re-identify it before shipping. In any case, standard practice consists of a chemical check-analysis to determine the quantities of the typifying elements in the alloy.

It is one of the main purposes of my invention to provide a method and a system for making a rapid identification of the unidentified finished material, without necessitating and requiring the elaborate and detailed chemical analysis that is now necessary, in order to identify a piece of metal during the working operation, or after it has been placed in stock at the warehouse.

The procedure of re-determining the composition of such metal pieces as heretofore employed, involved qualitative and quantitative chemical tests to determine the ingredients and the relative percentages of those ingredients.

That testing procedure required considerable time, about 80 minutes for each piece (average of three tests per piece for check analysis), since, frequently, several pieces had to be tested in order to locate the proper pieces that had the desired specifications corresponding to the known specifications of the heat from which that metal was made.

The problem that is involved is merely to identify the finished metal that was made from a particular heat, to a specific specification to meet the desired requirements.

In order to solve that problem of merely identifying the metal which was made from that heat, I provide a simple identifying system, which utilizes, and takes advantage of, the thermo-electric qualities of dissimilar metals when connected to constitute a thermo-couple junction. Since a test piece is usually kept from each heat of steel, this test piece may serve as a standard of known characteristics.

The attempt has, heretofore, been made to identify a piece of metal of unknown composition, by setting up a thermo-couple condition between that piece and a second piece of metal of known composition, with the region of contact between the two pieces heated (or cooled) to establish the hot junction of the thermo-couple and under conditions such that the thermo-electric current, if any, occasioned by the changing temperature conditions, would indicate the non-identity of the two pieces of metal.

An object of the present invention is to provide a new and improved procedure and a new and improved system for occasioning a heating effect at the point of contact of two such pieces of metal, so that the resulting thermo-couple effect may be ascertained over a relatively wide range of differential temperatures and be effectively employed in determining the identity or non-identity of the two pieces of metal.

In that manner, not only the identity or non-identity of two metal pieces may be immediately ascertained, but some clue to the composition of the unknown sample may even be obtained by observing the characteristics as well as the magnitudes of the resultant thermo-electric curve.

Generally, the practice of the present invention involves establishing a small spot weld between the two pieces of metal, and then immediately testing them to ascertain whether a thermo-electro-motive force is present, to determine thereby whether or not a thermo-couple is formed. The formation of a couple by the two pieces of metal, indicates the non-identity of the chemical composition of the two metals.

The spot weld can be established in various ways, but a preferred method is one which would not heat that part of the metal too much that is between the weld spot and the galvanometer connection, but which would concentrate the welding heat as much as possible in a small zone or area. The electric process is most suitable for making such a weld, since the weld region can be confined to the desired small area or spot. Furthermore, the larger mass of unheated metal serves to cool the heated weld spot in a relatively short time, to permit, thereby, a measurement of the thermo-electro-motive force generated over the entire range of temperature differentials between the weld spot and the opposite ends of the two pieces of metal that are at a lower temperature.

The general method of operation of the system, and the advantages thereof, may be understood from a consideration of the system as illustrated in the accompanying drawing, in which, Figure 1 is a diagram of a circuit in which the two pieces of metal may be welded at a point of intersection, and a galvanometer then connected to the two pieces of metal to measure any electro-motive force that may be generated between them while the weld spot is still hot;

Figure 1:
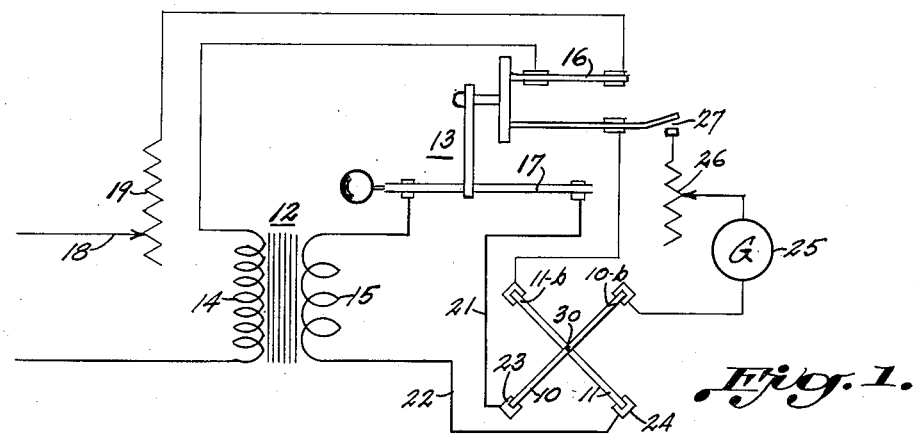

As shown in Figure 1, a piece of metal 10 of unknown composition is to be identified. Its appearance is such as to indicate that it is of a general commercial type, but it is desirable or necessary to identify it more exactly, as, for example, positively originating from a specific mixture or heat whose composition is known, and represented by a sample test piece II.

In order to identify the piece of metal 10, it may be tested by association with one or more sample test pieces, until the corresponding sample test piece is found which is identical in composition with the unknown piece 10.

This testing procedure, according to this invention, involves spot welding the unknown piece 10 and a test sample piece 11, of which the chemical composition is known, and then connecting a sensitive electrical instrument, such as a galvanometer, microvoltmeter, to the two pieces to ascertain whether a thermal voltage exists.

As shown in Figure 1, one method of forming a spot weld between the unknown 10 and the known 11, is accomplished through a transformer 12 and a switching device 13. The transformer is preferably of the welding type, having a high-voltage primary winding 14 and a low-voltage high-current density secondary winding 15.

The switching device 13 is shown as comprising a primary circuit switch 16, and a secondary circuit switch 17. The primary switch 16 is shown as a double-pole switch in order that one pivot terminal may be utilized that is insulated from the primary circuit.

The secondary switch 17 is relatively heavy to conduct the large secondary current, and it is mechanically connected to the primary switch 16 so a single operation will open or close both switches 16 and 17.

The primary winding of the transformer is connected to a suitable source of supply 18, through one pole of the switch 16 and through a variable control resistor 19. The secondary winding 15 is connected through the switch 17 to a pair of heavy, low-resistance cables 21 and 22, which are respectively provided with terminal clamps 23 and 24 at their ends.

If the metal pieces 10 and 11 are strips or plates, or parts having a small dimension to permit the clamps to be easily applied, the clamp may be of any suitable form that will establish a pressure contact of low resistance with the pieces 10 and 11.

Each clamp 23 and 24 is connected to one end of each sample, and the two samples are physically engaged to close the secondary circuit for the welding current. The opposite ends of the two pieces are then connected to a testing circuit including a galvanometer 25, an adjustable resistor 26, and a back-contact switch 27, that is open when primary switch 16 is closed and that is closed by the follow-through operation that opens switch 16. A short time interval may be provided between opening of switch 16 and closure of back-contact 27, to ensure de-energization of the transformer and decay of the magnetic flux field of the secondary circuit, in order to eliminate false effects on the galvanometer.

In order to establish the spot weld 30 between the two metal pieces 10 and 11, they are placed in contact where the area of contact will be relatively small, as, for example, with two corner edges engaging, with the two pieces transversely disposed relative to each other. The point of contact at which the weld will be established should be selected to be spaced somewhat from the ends or places on the pieces where the clamps 23 and 24 will be applied.

An advantage in forming the weld spot at a point between the ends of the two pieces 10 and 11, is that no sneak circuit is set up whereby any of the secondary welding current may traverse the testing circuit through the galvanometer that is employed to ascertain whether a thermo-couple voltage exists.

The testing circuit is connected to the pieces 10 and 11 immediately after the transformer is disconnected, so a voltage reading may be gotten, if it is present, while the weld spot is still practically at its maximum temperature.

If the two pieces 10 and 11 are identical, of course no reading will be shown by the galvanometer, and the desired identity of the unknown piece 10 will have been established. If the two pieces are not identical, a thermo-electric voltage will exist between the test ends 10—b and 11—b of the two samples 10 and 11, so long as the juncture or weld spot 30 is hotter than the ends to which the test circuit is connected.

If the test circuit is closed by back-contact 27, immediately after formation of the weld spot, the galvanometer will indicate the presence of a thermo-electric voltage, if any, during the entire cooling period of the weld spot. If a calibrated instrument be used, such as a microvoltmeter, either indicating or recording, in place of the galvanometer, a series of readings or a curve may be procured of the thermo-couple characteristic over the entire temperature range, from practically the melting point temperature to the normal ambient temperature. While this feature may not be an immediate essential, where the desired result is merely identification of the unknown sample, it does provide a corollary feature of advantage in this new art of comparing or identifying the compositions of metals by measuring the thermo-electric effects between two metals, one of which is of known composition.

In the arrangement shown in Figure 1, the testing circuit is preferably opened an instant before the primary switch is closed, to safeguard the testing circuit. The switching device in Figure 1 is illustrated for its functional nature, and could take various other forms, such as magnet switches with engaging contacts of proper current-carrying capacities. The important thing is to maintain a proper desired timing relation between the switching operations.

The adjustable resistor 26 in the testing circuit may be of any suitable type in which contact resistance will be substantially constant, such as, for example, a wound coil of manganin, and hermetically sealed or oil immersed, to prevent oxidation and to maintain good contact conditions.

Figure 2:
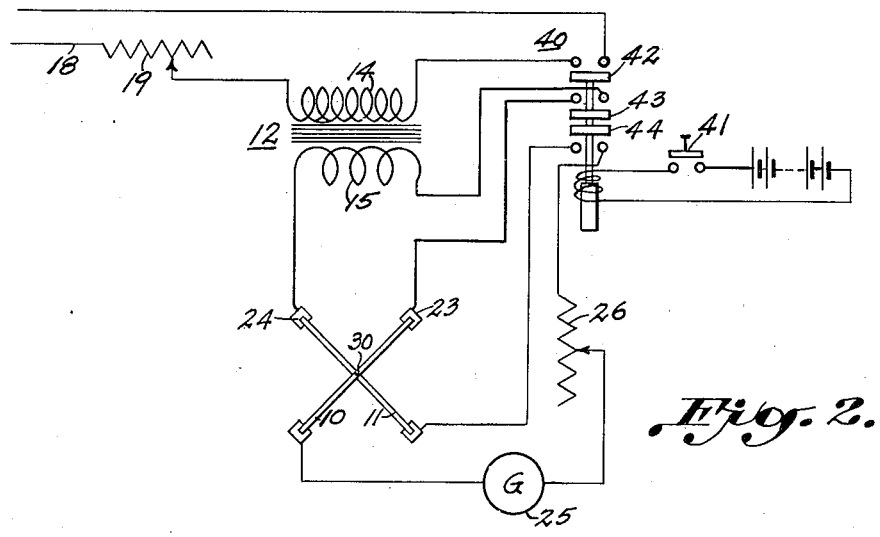
Figure 2 is a diagram of a similar circuit, but showing a different switching device.

In Figure 2, I have illustrated how a magnet switch 40 may be employed to control the circuit operations. The magnet switch 40 may be operated by a button switch 41, manually operated or operated by a suitable timing device. Three main contacts are operated by the magnet switch. One front contact 42 controls the primary transformer circuit, and a second front contact 43 controls the secondary transformer circuit. A back-contact 44 controls the galvanometer circuit. Timing may be established between the primary and the secondary contacts by suitable resilient mountings for the contacts to provide necessary lost-motion movement.

In some cases, the article of unknown composition, that is to be identified, may be too large to be conveniently moved or handled. In such case, the known sample may be easily applied to the surface of the unknown piece and the welding current supplied to establish the small spot weld, at some location where the presence of the spot will not mar the unknown piece.

Figure 3:
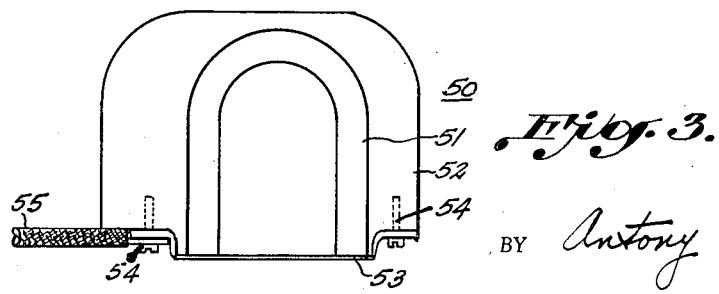
Figure 3 is a diagram of a circuit in which a magnet type of terminal connection which may be provided for metal pieces of large size or of unusual shape, to which a simple connection may not otherwise be easily made.

Since the testing circuit will carry only relatively small currents, the clamps that are used to provide the connections of the testing circuit to the samples, may be small. In Figure 3, I have illustrated a simple magnet-type contact clamp which may be used. That clamp 50 comprises a magnet 51, in a dielectric case 52 having a layer of copper foil 53 on its lower surface, and a terminal bolt 54 which serves as a retainer bolt, with one or more others, to hold the copper foil base attached to the magnet case 52. A conductor 55 is secured to the terminal bolt 54 and provides the electrical connection from the galvanometer to the metal piece 10 or 11.

I claim as my invention:

1. A metal identifying system comprising an electrical energy-translating apparatus to serve as a source of large current capacity sufficient to establish a spot weld between a piece of metal of unknown composition and a sample piece of metal of known composition; switching means for connecting the source to the two pieces of metal and for disconnecting the source; a sensitive electro-responsive device; and means controlled by the switching means for instantaneously connecting the electro-responsive device to the two metal elements at points spaced from the spot weld, when the switching means is operated to disconnect the source from the two pieces of metal immediately after the formation of a weld spot.

2. A method of comparing two pieces of metal to determine their similarity or dissimilarity, which consists in placing a piece of metal of known composition in thermo-couple relationship with a piece of metal of unknown composition such that the contact between the two pieces approximates point contact, passing an electric current of high heat producing intensity from one such piece to the other through such point of contact to heat the contacting portion of each such piece, stopping the passage of such heating current and before the dissipation of the heat produced thereby and while maintaining the contact between such pieces measuring a value of the thermo-electric current, if any, occasioned by such heating of the point of contact between such pieces.

3. A method of comparing two pieces of metal to determine their similarity or dissimilarity, which consists in placing a piece of metal of known composition in thermo-couple relationship with a piece of metal of unknown composition such that the contact area between said pieces is restricted and constitutes the hot junction of the thermo-couple so produced; passing an electric current from one such piece to the other through such hot junction and thereby producing a weld at such junction; stopping the passage of such current and, before the dissipation of the heat of such weld and while the welded junction between such pieces is maintained as such, measuring a value of the thermo-electric current, if any, occasioned by the heating of such elements at their point of contact.

4. A metal identifying system for comparing two pieces of metal to determine their similarity or dissimilarity, comprising a source of electric current such as to occasion a weld between two pieces of metal located in a thermo-couple relationship such that the region of contact between the two pieces, constituting the hot junction, approximates point contact; means for electrically connecting said pieces in circuit relationship with said source such that heating current flows from one such piece to the other through said hot junction; an electro-responsive device for measuring a value of thermo-electric current; means for electrically connecting said device in circuit relationship with such pieces such that said hot junction is included in the circuit with said device and switching means for opening one and closing the other such circuits such that one such circuit is open when the other is closed.

ANTONY DOSCHEK.